United States Patent
Kinomoto

(10) Patent No.: US 10,623,267 B2
(45) Date of Patent: Apr. 14, 2020

(54) DEVICE MANAGEMENT SYSTEM AND DEVICE MANAGEMENT DEVICE

(71) Applicant: RICOH COMPANY, LTD., Tokyo (JP)

(72) Inventor: Tsutomu Kinomoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 295 days.

(21) Appl. No.: 15/428,204

(22) Filed: Feb. 9, 2017

(65) Prior Publication Data
US 2017/0272328 A1 Sep. 21, 2017

(30) Foreign Application Priority Data
Mar. 16, 2016 (JP) .................. 2016-052590

(51) Int. Cl.
*H04L 12/24* (2006.01)

(52) U.S. Cl.
CPC .............. *H04L 41/12* (2013.01); *H04L 41/22* (2013.01)

(58) Field of Classification Search
CPC ............................... H04L 41/22; H04L 41/12
USPC ........................................................ 709/223
See application file for complete search history.

(56) References Cited

U.S. PATENT DOCUMENTS

| | | | | |
|---|---|---|---|---|
| 6,999,779 B1 * | 2/2006 | Hashimoto | .......... | G01C 21/005 342/357.31 |
| 7,194,526 B2 * | 3/2007 | Kanemitsu | .......... | H04L 41/0253 709/220 |
| 7,950,766 B2 | 5/2011 | Ejiri et al. | | |
| 8,316,304 B2 * | 11/2012 | Yamashita | .......... | H04L 41/0253 709/203 |
| 8,725,855 B2 | 5/2014 | Reiss | | |
| 2005/0137827 A1 | 6/2005 | Takamiya | | |
| 2007/0097161 A1 | 5/2007 | Ejiri et al. | | |
| 2011/0307589 A1 | 12/2011 | Reiss | | |
| 2011/0320593 A1 | 12/2011 | Takami et al. | | |

(Continued)

FOREIGN PATENT DOCUMENTS

| CN | 1958293 A | 5/2007 |
|---|---|---|
| CN | 102298560 A | 12/2011 |

(Continued)

OTHER PUBLICATIONS

Office Action dated Sep. 29, 2019, in Chinese Patent Application No. 2017101542951 (with English-language Translation) citing documents AA and AO-AR therein.

*Primary Examiner* — Brian Whipple
*Assistant Examiner* — John Fan
(74) *Attorney, Agent, or Firm* — Oblon, McClelland, Maier & Neustadt, L.L.P.

(57) ABSTRACT

A device management device that manages multiple devices, the device management device includes circuitry configured to generate second device identifying information of a given device based on first device identifying information that uniquely identifies the device and positional information representing the position of the device and, when positional information that matches the acquired positional information is managed, update the first device identifying information and the second device identifying information that are associated with the managed positional information respectively by using the first device identifying information and the generated second device identifying information.

13 Claims, 13 Drawing Sheets

(56) References Cited

U.S. PATENT DOCUMENTS

| | | | | |
|---|---|---|---|---|
| 2012/0257621 A1* | 10/2012 | Ishii | .................... | H04L 41/0853 370/389 |
| 2013/0246924 A1* | 9/2013 | Tan | ..................... | G06F 3/04815 715/736 |
| 2014/0266669 A1* | 9/2014 | Fadell | .................. | G05B 19/042 340/501 |
| 2015/0382146 A1* | 12/2015 | Takaoka | ................ | H04W 4/023 455/456.3 |

FOREIGN PATENT DOCUMENTS

| | | |
|---|---|---|
| CN | 103026661 A | 4/2013 |
| CN | 105306546 A | 2/2016 |
| JP | 2010-219750 | 9/2010 |

* cited by examiner

FIG.7

| SERIAL NUMBER | MAC ADDRESS | IP ADDRESS | COUNTER VALUE |
|---|---|---|---|
| AAAAAAAA | BBBBBBBBBBBB | CCCCCCCCCCCC | 0 |

FIG.8

| SERIAL NUMBER | POSITIONAL INFORMATION |
|---|---|
| AAAAAAAA | (ddd, eee) |

FIG.9

| SERIAL NUMBER | POSITIONAL INFORMATION |
|---|---|
| AAAAAAAB | (ddd, eee) |
| AAAAAAAC | (ddb, eeb) |
| ⋮ | ⋮ |

FIG.10

| SERIAL NUMBER | POSITIONAL INFORMATION |
|---|---|
| AAAAAAAB | (ddd, eee) |
| AAAAAAAC | (ddb, eeb) |
| AAAAAAAA | (ddd, eee) |
| ⋮ | ⋮ |

FIG.11

| DEVICE ID | SERIAL NUMBER | MAC ADDRESS | IP ADDRESS | COUNTER VALUE | POSITIONAL INFORMATION |
|---|---|---|---|---|---|
| MAAAAAAB | AAAAAAB | BBBBBBBBBBBC | CCCCCCCCCCCD | 1000 | (ddd, eee) |
| MAAAAAAC | AAAAAAC | BBBBBBBBBBBD | CCCCCCCCCCCE | 100 | (ddb, eeb) |
| ... | ... | ... | ... | ... | ... |

FIG.12

| | | | | | GENERAL |
|---|---|---|---|---|---|
| REGISTERED DEVICE RE-SEARCHING | | | | | |

DISCOVERY AREA (NETWORK SEARCH) | ACCESS COUNT SETTING

| SUBJECT/ NON-SUBJECT | HOST NAME | START | END | SUBNET MASK | TYPE |
|---|---|---|---|---|---|
| SUBJECT | | 10.61.54.200 | 10.61.55.205 | 255.255.255.0 | SPECIFY IP RANGE |

SUBJECT/ NON-SUBJECT: ● SUBJECT ○ NON-SUBJECT

TYPE: ○ HOST NAME  ○ IP ADDRESS ● SPECIFY IP RANGE  ○ IPv6 ADDRESS

HOST NAME:

START*: 10.61.54.200

END*: 10.61.55.205

SUBNET MASK*: 255.255.255.0

FIG.13

| DEVICE ID | SERIAL NUMBER | MAC ADDRESS | IP ADDRESS | COUNTER VALUE |
|---|---|---|---|---|
| MAAAAAAAA | AAAAAAAA | BBBBBBBBBBBB | CCCCCCCCCCCC | 0 |

FIG.14

| DEVICE ID | SERIAL NUMBER | MAC ADDRESS | IP ADDRESS | COUNTER VALUE | POSITIONAL INFORMATION |
|---|---|---|---|---|---|
| MAAAAAAA | AAAAAAA | BBBBBBBBBB | CCCCCCCCCC | 1000 | (ddd, eee) |
| MAAAAAAC | AAAAAAC | BBBBBBBBBD | CCCCCCCCCE | 100 | (ddb, eeb) |
| ... | ... | ... | ... | ... | ... | ns
DEVICE MANAGEMENT SYSTEM AND DEVICE MANAGEMENT DEVICE

CROSS-REFERENCE TO RELATED APPLICATIONS

The present application claims priority under 35 U.S.C. § 119 to Japanese Patent Application No. 2016-052590, filed Mar. 16, 2016. The contents of which are incorporated herein by reference in their entirety.

BACKGROUND OF THE INVENTION

1. Field of the Invention

The embodiments discussed herein are directed to a device management system and a device management device.

2. Description of the Related Art

Conventionally, a device management device that manages devices to be managed by acquiring, from the devices to be managed via a network, device management information for managing the devices and managing the device management information has been known.

With respect to the above-described technology, however, when the device identifying information unique to the device is changed because of, for example, replacement of the board of the device to be managed or replacement of the device itself, even though the device should be intrinsically determined as the same devices to be managed, the device is determined as different devices to be managed.

In view of the above-described circumstances, there is a need to provide a device management system, a device management device, and a device management method that make it possible to, even when device identifying information differs between a device to be managed whose corresponding device management information is taken over and a device to be managed to which the device management information is taken over, take over and manage the device management information.

SUMMARY OF THE INVENTION

According to exemplary embodiments of the present invention, there is provided a device management system comprising: a position management device that manages the positions of multiple devices; and a device management device that is connected to the position management device via a first network and that manages at least one of the devices to be managed, wherein the position management device includes circuitry configured to manage, with respect to each of the multiple devices, position management information in which first device identifying information that uniquely identifies the device and positional information representing the position of the device are associated with each other, and the device management device includes circuitry configured to manage, with respect to each of the at least one of the multiple devices to be managed, device information in which the first device identifying information of the device to be managed, second device identifying information that uniquely identifies the device to be managed, device management information for managing the device to be managed, and the positional information on the device to be managed are associated with one another; issue, to a given one of the multiple devices, a request for the second device identifying information of the given device and, when the second device identifying information is not acquired, acquire the first device identifying information of the given device from the given device; and acquire, from the position management device, positional information that is associated with the acquired first device identifying information, wherein the circuitry of the device management device generates second device identifying information of the given device based on the acquired first device identifying information and, when positional information that matches the acquired positional information is managed, updates the first device identifying information and the second device identifying information that are associated with the managed positional information respectively by using the acquired first device identifying information and the generated second device identifying information.

Exemplary embodiments of the present invention also provide a device management device that manages multiple devices, the device management device includes circuitry configured to manage, with respect to each of the multiple devices, position management information in which first device identifying information that uniquely identifies the device and positional information representing the position of the device are associated with each other; manage, with respect to each of at least one of the multiple devices to be managed, device information in which the first device identifying information of the device to be managed, second device identifying information that uniquely identifies the device to be managed, device management information for managing the device to be managed, and the positional information on the device to be managed are associated with one another; issue, to a given one of the multiple devices, a request for the second device identifying information of the given device and, when the second device identifying information is not acquired, acquire the first device identifying information of the given device from the given device; and acquire positional information that is associated with the acquired first device identifying information, wherein the circuitry generates second device identifying information of the given device based on the acquired first device identifying information and, when positional information that matches the acquired positional information is managed, updates the first device identifying information and the second device identifying information that are associated with the managed positional information respectively by using the acquired first device identifying information and the generated second device identifying information.

Exemplary embodiments of the present invention also provide a device management system comprising: a position management device that manages the positions of multiple members that can be used for at least one device to be managed; and a device management device that is connected to the position management device via a first network and that manages the at least one device to be managed, wherein the position management device includes circuitry configured to manage, with respect to each of the multiple devices, position management information in which member identifying information that uniquely identifies the member and positional information representing the position of the member are associated with each other, and the device management device includes circuitry configured to manage, with respect to each of the at least one device to be managed, device information in which the member identifying information of the member used for the device to be managed, device management information for managing the device to be managed, the positional information on the member, and device identifying information that uniquely identifies the device to be managed are associated with one another; issue, to a given one of the at least one device to be managed, a request for the device identifying information of the given device to be managed and, when the device identifying information is not acquired, acquire the member identifying information of the member used for the given device to be managed from the given device to be managed; and acquire, from the position management device, positional information that is associated with the acquired member identifying information, and generate device identifying information of the given device to be managed based on the acquired member identifying information and, when positional information that matches the acquired positional information is managed, update the member identifying information and the device identifying information that are associated with the managed positional information respectively by using the acquired member identifying information and the generated device identifying information.

BRIEF DESCRIPTION OF THE DRAWINGS

FIG. 7 is a diagram of exemplary individual device information that is stored in an individual device information storage unit of the first embodiment;

FIG. 8 is a diagram of exemplary information that is stored in a positional information storage unit of the first embodiment;

FIG. 9 is a diagram of exemplary position management information that is stored in a storage unit of the first embodiment;

FIG. 10 is a diagram of exemplary position management information that is stored in the storage unit of the first embodiment;

FIG. 11 is a diagram of exemplary device information that is stored in the storage unit of the first embodiment;

FIG. 12 is a diagram of an exemplary search screen of the first embodiment;

FIG. 13 is a diagram of exemplary individual device information that is stored in the individual device information storage unit of the first embodiment;

FIG. 14 is a diagram of exemplary device information that is stored in the storage unit of the first embodiment;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
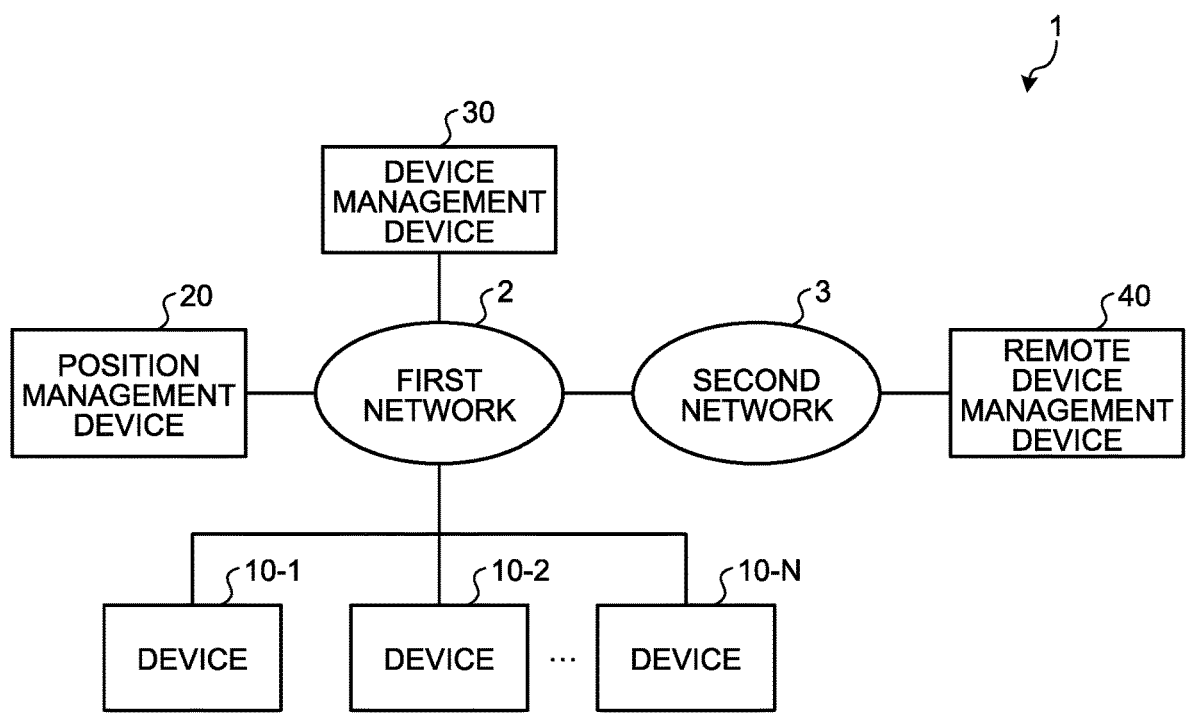
FIG. 1 is a block diagram of an exemplary configuration of a device management system of a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Embodiments of the device management system, and the device management device of the invention will be described in detail below with reference to the accompanying drawings.

First Embodiment

FIG. 1 is a block diagram of an exemplary configuration of a device management system 1 according to a first embodiment. As illustrated in FIG. 1, the device management system 1 includes devices 10-1 to 10-N (N is a natural number that is 2 or larger), a position management device 20, a device management device 30, and a remote device management device 40.

The devices 10-1 to 10-N, the position management device 20 and the device management device 30 are connected to a first network 2. The remote device management device 40 is connected to a second network 3. The first network 2 and the second network 3 are connected to each other. The first network 2 is implemented by using, for example, a local area network (LAN) and the second network 3 is implemented by using, for example, the Internet.

The device management device 30 is communicable with the devices 10-1 to 10-N and the position management device 20 via the first network 2 and is communicable with the remote device management device 40 via the first network 2 and the second network 3. The position management device 20 is communicable with the devices 10-1 to 10-N by near-field communications using, for example, radio frequency identification (RFID).

In the following descriptions, the devices 10-1 to 10-N will be referred to simply as the devices 10 when it is unnecessary to distinguish the devices 10-1 to 10-N from one another.

The positions of the devices 10-1 to 10-N are managed by the position management device 20. At least one of the devices 10-1 to 10-N is a device to be managed by the device management device 30. At least one device 10 to be managed among the devices 10-1 to 10-N is managed by the device management device 30.

The device 10 is, for example, any one of image forming devices, such as a printing device, a copier, a multifunctional peripheral, a scanner device and a facsimile device; a variety of electric devices, such as a projector, a camera, an air conditioner, a refrigerator, a fluorescent lighting, a vending machine and a hand-held terminal; and a personal computer (PC). The multifunctional peripheral has at least two of a copying function, a printing function, a scanner function, and a facsimile function. The first embodiment exemplifies the case where the devices 10 are image forming devices; however, the devices are not limited to this.

Figure 2:
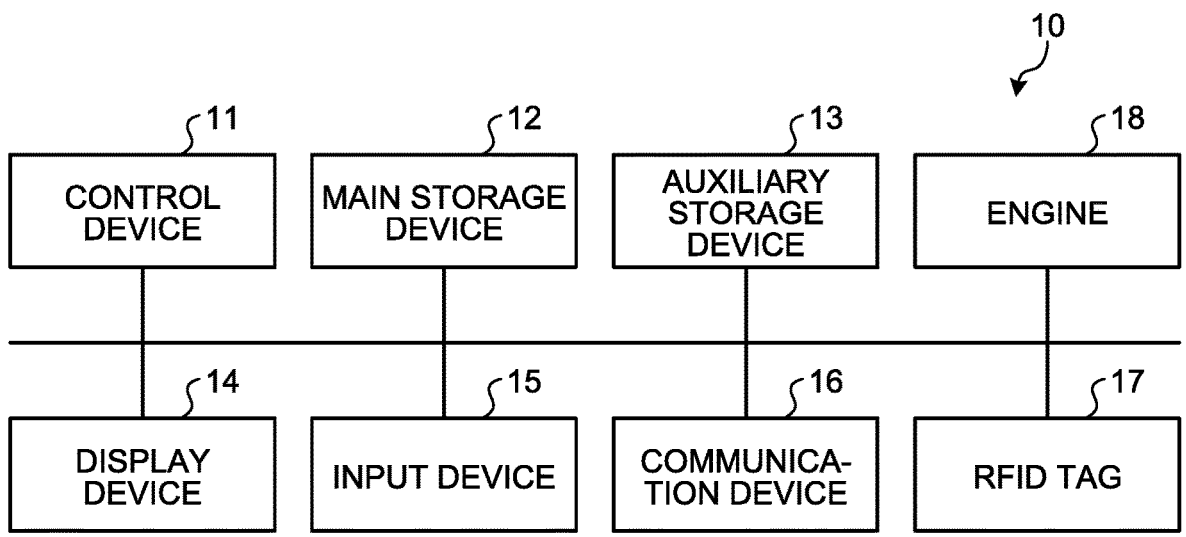
FIG. 2 is a block diagram of an exemplary hardware configuration of a device of the first embodiment.

FIG. 2 is a block diagram of an exemplary hardware configuration of the device 10 of the first embodiment. The device 10 includes a control device 11, such as a central processing unit (CPU); a main storage device 12, such as a read only memory (ROM) or a random access memory (RAM); an auxiliary storage device 13, such as a hard disk drive (HDD) or a solid state drive (SSD); a display device 14, such as an operation panel; an input device 15; a communication device 16, such as a communication interface; a RFID tag 17 for near-field communications; and an engine 18.

The first embodiment exemplifies the case where the RFID tag 17 is an active tag that actively transmits radio waves; however, the RFID tag 17 is not limited to this.

The engine 18 implements various functions, such as the copying function, the scanner function, the facsimile function, and the printer function. The engine 18 is hardware that performs general-purpose information processing for implementing the functions and processing other than communications. The engine 18 includes a scanner that reads an image on an original, a plotter that performs printing on a sheet matter, such as a paper sheet, and a facsimile unit that performs facsimile communications.

The position management device 20 manages the positions in which the devices 10-1 to 10-N are arranged. The position management device 20 is implemented by using, for example, one or more of computers.

Figure 3:
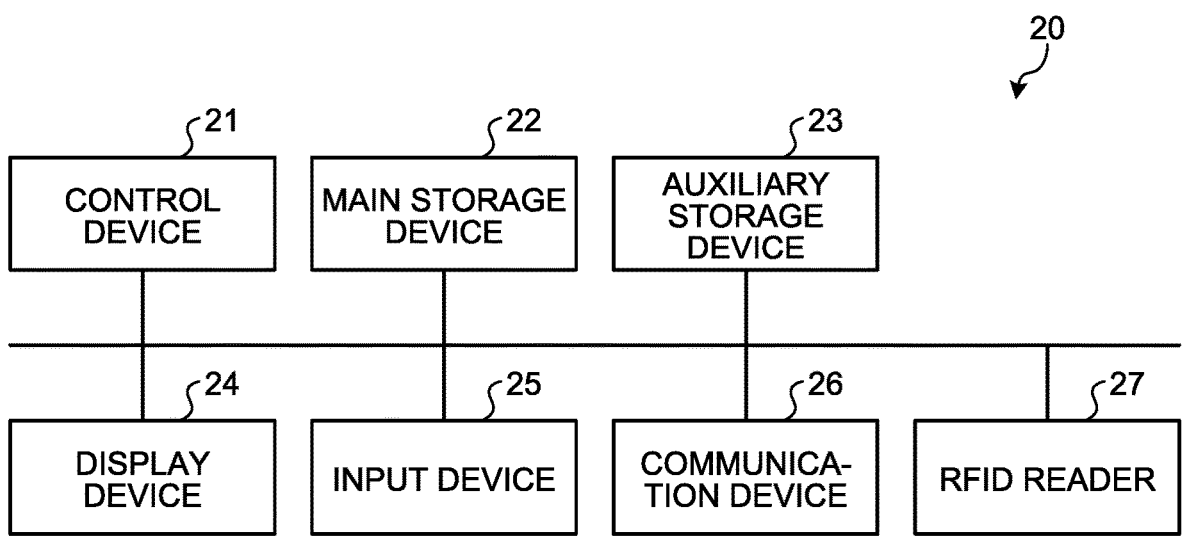
FIG. 3 is a block diagram of an exemplary hardware configuration of a position management device of the first embodiment.

FIG. 3 is a block diagram of an exemplary hardware configuration of the position management device 20 of the first embodiment. The position management device 20 includes a control device 21, such as a CPU; a main storage device 22, such as a ROM or a RAM; an auxiliary storage device 23, such as a HDD or a SSD; a display device 24, such as a display; an input device 25, such as a keyboard and a mouse; a communication device 26, such as a communication interface; and a RFID reader 27 for near-field communications. The position management device 20 has a hardware configuration using a general-purpose computer.

The device management device 30 manages the devices to be managed among the devices 10-1 to 10-N. The device management device 30 is implemented by using, for example, one or more of computers.

Figure 4:
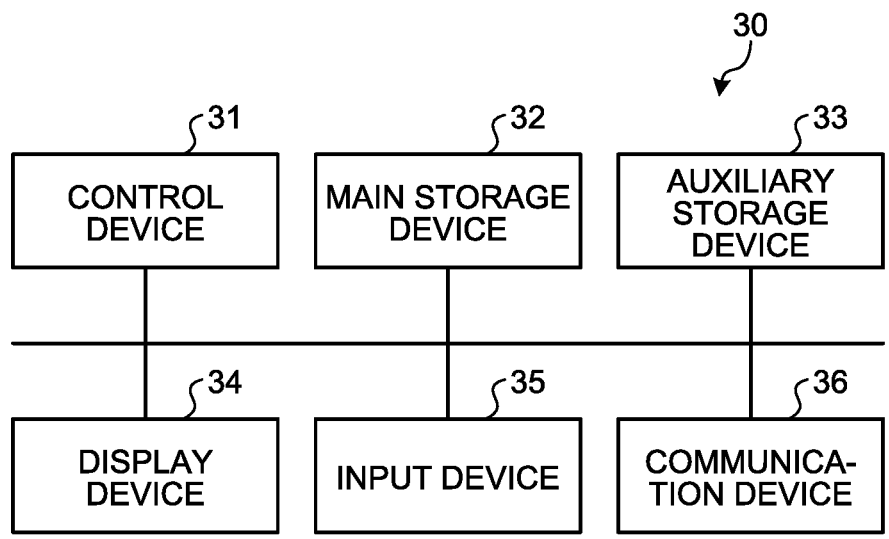
FIG. 4 is a block diagram of an exemplary hardware configuration of a device management device of the first embodiment.

FIG. 4 is a block diagram of an exemplary hardware configuration of the device management device 30 of the first embodiment. The device management device 30 includes a control device 31, such as a CPU; a main storage device 32, such as a ROM or a RAM; an auxiliary storage device 33, such as a HDD or a SSD; a display device 34, such as a display; an input device 35, such as a keyboard and a mouse; and a communication device 36, such as a communication interface. The device management device 30 has a hardware configuration using a general-purpose computer.

The remote device management device 40 manages at least one of the devices 10 to be managed via the device management device 30. The remote device management device 40 is implemented by using at last one computer.

Figure 5:
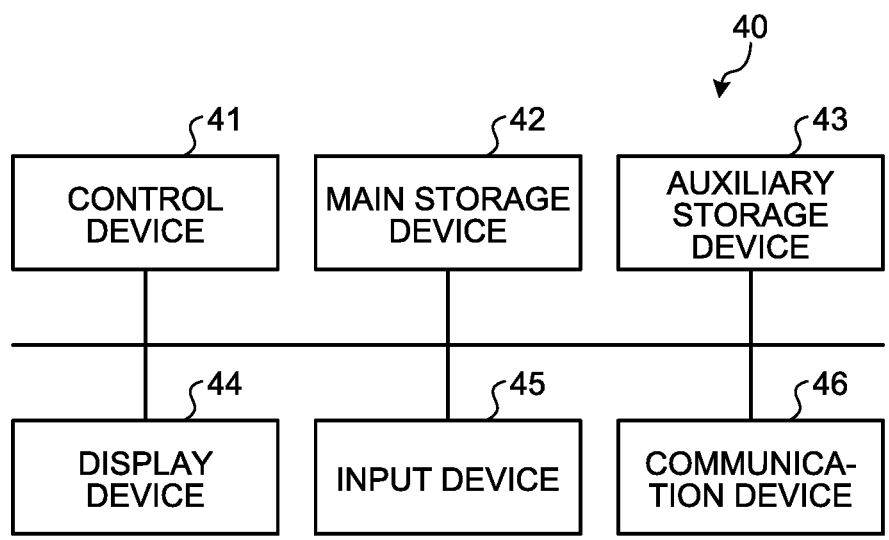
FIG. 5 is a block diagram of an exemplary hardware configuration of a remote device management device of the first embodiment.

FIG. 5 is a block diagram of an exemplary hardware configuration of the remote device management device 40 of the first embodiment. The remote device management device 40 includes a control device 41, such as a CPU; a main storage device 42, such as a ROM or a RAM; an auxiliary storage device 43, such as a HDD or a SSD; a display device 44, such as a display; an input device 45, such as a keyboard and a mouse; and a communication device 46, such as a communication interface. The remote device management device 40 has a hardware configuration using a general-purpose computer.

Figure 6:
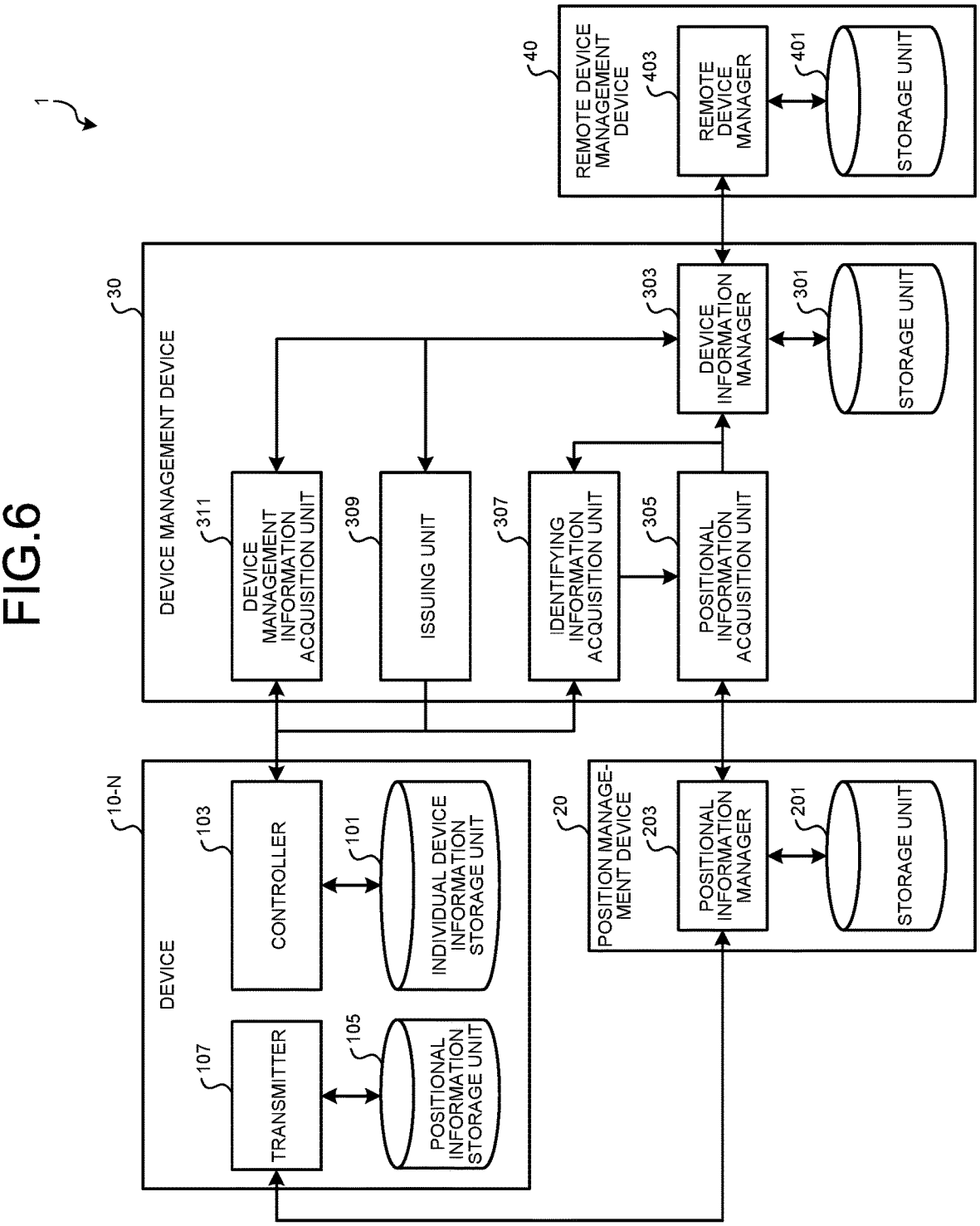
FIG. 6 is a block diagram of an exemplary functional configuration of a device management system of the first embodiment.

FIG. 6 is a block diagram of an exemplary functional configuration of the device management system 1 of the first embodiment. Note that the devices 10-1 to 10-N have the same functional configuration and thus FIG. 6 exemplifies only the device 10-N and omits illustrations of the devices 10-1 to 10-N-1. Furthermore, FIG. 6 exemplifies the arranged device 10-N with which the existing device 10 to be managed is replaced due to its failure, i.e., the device 10-N has not become a device to be managed by the device management device 30. Note that the device 10-N is arranged in the position where the failed existing device 10 to be managed was arranged.

As illustrated in FIG. 6, the device 10-N includes an individual device information storage unit 101, a controller 103, a positional information storage unit 105 and a transmitter 107. The individual device information storage unit 101 is implemented by using, for example, the auxiliary storage device 13. The controller 103 is implemented by using, for example, the control device 11, the main storage device 12 and the communication device 16. The positional information storage unit 105 and the transmitter 107 are implemented by using, for example, the RFID tag 17.

Furthermore, as illustrated in FIG. 6, the position management device 20 includes a storage unit 201 and a positional information manager 203. The storage unit 201 is implemented by using, for example, the auxiliary storage device 23. The positional information manager 203 is implemented by using, for example, the control device 21, the main storage device 22, the communication device 26 and the RFID reader 27.

As illustrated in FIG. 6, the device management device 30 includes a storage unit 301, a device information manager 303, a positional information acquisition unit 305, an identifying information acquisition unit 307, an issuing unit 309 and a device management information acquisition unit 311.

The storage unit 301 is implemented by using, for example, the auxiliary storage device 33. The device information manager 303, the positional information acquisition unit 305, the identifying information acquisition unit 307, the issuing unit 309 and the device management information acquisition unit 311 are implemented by using, for example, the control device 31, the main storage device 32 and the communication device 36.

As illustrated in FIG. 6, the remote device management device 40 includes a storage unit 401 and a remote device manager 403. The storage unit 401 is implemented by using, for example, the auxiliary storage device 43. The remote device manager 403 is implemented by using, for example, the control device 41, the main storage device 42 and the communication device 46.

The individual device information storage unit 101 stores individual device information on the device 10-N. The individual device information on the device 10-N contains at least first device identifying information that uniquely identifies the device 10-N and device management information that manages the device 10-N.

The first embodiment exemplifies a case where the first device identifying information is a serial number; however, the first device identifying information is not limited to this. It is satisfactory if the first device identifying information of the device 10-N is information that uniquely identify the device 10-N. The first device identifying information may be, for example, a media access control (MAC) address.

The first embodiment exemplifies the case where the device management information is a counter value; however, the device management information is not limited to this. It is satisfactory if the device management information on the device 10-N is information that manages the device 10-N. For example, the device management information is information that varies according to operations of the device, such as the running time and the amount of remaining toner.

FIG. 7 is a diagram of exemplary individual device information on the device 10-N that is stored in the individual device information storage unit 101 of the first embodiment. In the example illustrated in FIG. 7, the individual device information contains a serial number, a MAC address, an IP address and a counter value.

The controller 103 manages the individual device information in the individual device information storage unit 101. In response to a request from the device management device 30, the controller 103 provides, to the device management device 30, the information requested to be acquired that is contained in the individual device information stored in the individual device information storage unit 101. Once the device 10-N performs, for example, printing, the controller 103 updates the device management information (counter value) contained in the individual device information that is stored in the individual device information storage unit 101.

The positional information storage unit 105 stores the positional information representing the position of the device 10-N in association with the first device identifying information of the device 10-N. The first embodiment exemplifies the case where the positional information on the device 10-N is a coordinates value representing the position in which the device 10-N is arranged; however, the positional information is not limited to this.

FIG. 8 is a diagram of exemplary information that is stored in the positional information storage unit 105 of the first embodiment. In the example illustrated in FIG. 8, the positional information storage unit 105 stores the serial number of the device 10-N and the positional information on the device 10-N in association with each other.

The transmitter 107 regularly transmits radio waves containing the serial number of the device 10-N and the positional information on the device 10-N, which are stored in the positional information storage unit 105, by near-field communications.

The storage unit 201 stores, with respect to each of the devices 10-1 to 10-N, position management information in which the first device identifying information of the device 10 and the positional information on the device 10 are associated with each other.

FIG. 9 is a diagram of exemplary position management information that is stored in the storage unit 201 of the first embodiment. In the example illustrated in FIG. 9, the storage unit 201 stores, with respect to each of the devices 10-1 to 10-N−1, position management information in which the serial number of the device 10 and the positional information on the device 10 are associated with each other. In the example illustrated in FIG. 9, a set of the serial number of the device 10-N and the positional information on the device 10-N are not contained in the position management information.

The positional information manager 203 manages the position management information in the storage unit 201 and, in response to a request from the device management device 30, provides the position management information or the positional information requested to be acquired, which are stored in the storage unit 201, to the device management device 30.

The positional information manager 203 regularly acquires, from each of the devices 10-1 to 10-N, the first device identifying information of the device 10 and the positional information on the device 10. In the first embodiment, by receiving radio waves that are transmitted regularly from each of the devices 10-1 to 10-N, the positional information manager 203 acquires the first device identifying information of the device 10 and the positional information on the device 10.

The first embodiment exemplifies the case where the radio waves transmitted from the device 10 contains the positional information on the device 10; however, the radio waves do not necessarily contain the positional information. The positional information manager 203 may specify the position of the device 10 from the radio-wave reception intensity and generate positional information representing the specified position.

When first device identifying information that matches the acquired first device identifying information is stored in the storage unit 201, the positional information manager 203 updates the positional information that is associated with the first device identifying information by using the acquired positional information.

On the other hand, when no first device identifying information that matches the acquired first device identifying information is stored in the storage unit 201, the positional information manager 203 registers a set of the acquired first device identifying information and the positional information in the position management information.

Accordingly, in the case the position management information that is stored in the storage unit 201 is the positional information represented in FIG. 9, when the positional information manager 203 acquires a set of the first device identifying information of the device 10-N and the positional information on the device 10-N, the position management information that is stored in the storage unit 201 is updated to the position management information illustrated in FIG. 10.

In the position management information represented in FIG. 10, the same positional information (ddd,eee) as the positional information (ddd,eee) on the device 10-N is registered, and the device 10 corresponding to this positional information (the device 10 whose serial number is (AAAAAAAB)) is the existing device 10 to be managed that is replaced with the device 10-N.

The storage unit 301 stores the device information with respect to each of the devices 10-1 to 10-N−1 to be managed. The device information contains at least first device identifying information of the device 10 to be managed, second device identifying information that uniquely identifies the device 10 to be managed, device management information on the device 10 to be managed, and positional information on the device 10 to be managed.

The first embodiment exemplifies the case where the second device identifying information is a device ID for managing the device 10 to be managed; however, the second device identifying information is not limited to this. Any information may be used as long as the information uniquely identifies the device 10 to be managed. In the first embodiment, the second device identifying information is generated from the first device identifying information and the second device identifying information uniquely identifies the device 10 to be managed; however, the second device identifying information is not necessarily generated from the first device identifying information as long as the second device identifying information uniquely identify the device 10 to be managed.

FIG. 11 is a diagram of exemplary device information that is stored in the storage unit 301 of the first embodiment. In the example represented in FIG. 11, the storage unit 301 stores, with respect to each of the devices 10-1 to 10-N-1, device information in which a device ID, a serial number, a MAC address, an IP address, a counter value, and positional information corresponding to the device 10 to be managed are associated one another.

The device ID is issued by the issuing unit 309, the serial number, the MAC address, the IP address and the counter value are acquired from the device 10 to be managed, and the positional information is acquired from the position management device 20. In the example illustrated in FIG. 11, a set of the device ID, the serial number, the MAC address, the IP address, the counter value, and the positional information corresponding to the device 10-N are not contained in the device information. Thus, the first embodiment takes the device 10-N as an example and illustrates how the device ID, the serial number, the MAC address, the IP address, the counter value, and the positional information corresponding to the device 10-N are registered in the device information and how the device 10-N becomes the device 10 to be managed.

The device information manager 303 manages the device information in the storage unit 301 and performs various types of control for managing the device information.

For example, the device information manager 303 regularly instructs the positional information acquisition unit 305 to acquire the position management information from the position management device 20. The positional information acquisition unit 305 thus regularly acquires the position management information from the position management device 20. Specifically, the positional information acquisition unit 305 acquires the position management information from the position management device 20 according to an instruction to acquire the position management information from the device information manager 303.

The device information manager 303 then updates the positional information contained in the device information that is managed in the storage unit 301 to the latest one by using the position management information that is acquired by the positional information acquisition unit 305. Specifically, by using the positional information that is associated with the first device identifying information that is contained in the position management information, the device information manager 303 updates, in the device information, the positional information associated with the first device identifying information that matches the first device identifying information contained in the position management information.

For example, the positional information acquisition unit 305 acquires the position management information represented in FIG. 10 and, when the device information represented in FIG. 11 is managed in the storage unit 301, the positional information on the device 10 whose serial number is (AAAAAAAB) is updated from (ddd,eee) to (ddd,eee) and the positional information on the device 10 whose serial number is (AAAAAAAC) is updated from (ddb,eeb) to (ddb,eeb).

The positional information on the device 10-N whose serial number is (AAAAAAAA) is not updated as the serial number is contained in the position management information but is not contained in the device information.

The device information manager 303 regularly requests the identifying information acquisition unit 307 to acquire the second identifying information on a given device 10 among the devices 10-1 to 10-N from the given device 10. Specifically, the device information manager 303 specifies a give IP address and, when there is a device 10 corresponding to the IP address, issues a request to acquire the second device identifying information of the device 10.

The IP address is specified by issuing, for example, an instruction to transmit a broadcast message or an instruction to transmit a Ping Sweep message. The range of IP addresses to which a Ping Sweep message is transmitted may be determined, for example, in a way that the device information manager 303 displays a screen for searching the devices 10 illustrated in FIG. 12 on the display device 34 and, for example, a manager makes an operation input to specify the range of IP addresses on the search screen by using the input device 35, or the range may be specified via the remote device management device 40.

The identifying information acquisition unit 307 issues, to the given device 10 among the devices 10-1 to 10-N, a request for the second identifying information of the device 10. Specifically, the identifying information acquisition unit 307 issues a request for the second device identifying information to the IP address that is specified by the device information manager 303.

When there is not the given device 10 corresponding to the specified IP address, no response is made. When the given device 10 corresponding to the specified IP address is the device 10 to be managed, the device 10 holds the second device identifying information and thus the second device identifying information of the given device 10 is sent back as a response from the given device 10. On the other hand, when the given device 10 corresponding to the specified IP address is not the device 10 to be managed, the device 10 does not hold the second device identifying information and thus an error is sent as a response from the given device 10.

When the identifying information acquisition unit 307 cannot acquire the second device identifying information of the given device 10 (when an error is sent as a response), the identifying information acquisition unit 307 acquires the first device identifying information of the given device 10 from the given device 10. In the first embodiment, the identifying information acquisition unit 307 acquires not only the serial number that is the first device identifying information but also the MAC address and the IP address.

When the identifying information acquisition unit 307 acquires the second device identifying information of the given device 10, the device information manager 303 confirms that the device information that is managed in the storage unit 301 contains the second device identifying information and the given device 10 is the device 10 to be managed.

On the other hand, when the identifying information acquisition unit 307 acquires the first device identifying information of the given device 10 (the device 10-N), the device information manager 303 confirms that the given device 10 (the device 10-N) is not the device 10 to be managed and instructs the positional information acquisition unit 305 to acquire the positional information that is associated with the first device identifying information. Accordingly, the positional information acquisition unit 305 acquires, from the position management device 20, the positional information associated with the first device identifying information of the given device 10 (the device 10-N) that is acquired by the identifying information acquisition unit 307.

For example, when the acquired first device identifying information (serial number) of the given device 10 (the device 10-N) is "AAAAAAAA" (see FIG. 7), the positional information acquisition unit 305 acquires, from the position management device 20, (ddd,eee) that is the positional information associated with the first device identifying information in the position management information (see FIG. 10).

The device information manager 303 further generates second device identifying information of the given device 10 (the device 10-N) based on the first device identifying information of the given device 10 (the device 10-N) that is acquired by the identifying information acquisition unit 307. The device information manager 303 instructs the issuing unit 309 to issue the generated second device identifying information to the given device 10 (the device 10-N). Accordingly, the issuing unit 309 issues the second device identifying information, which is generated by the device information manager 303, to the given device 10 (the device 10-N) and the controller 103 of the given device 10 (the device 10-N) registers the issued second device identifying information in the individual device information that is stored in the individual device information storage unit 101. As a result, the individual device information that is stored in the individual device information storage unit 101 is updated from the individual device information represented in FIG. 7 to the individual device information represented in FIG. 13.

When positional information matching the positional information that is acquired by the positional information acquisition unit 305 is managed in the device information stored in the storage unit 301, the device information manager 303 updates the first device identifying information and the second device identifying information that are associated with the managed positional information by using the acquired first device identifying information and the generated second device identifying information.

Assume that, for example, the device information represented in FIG. 11 is managed in the storage unit 301, the first device identifying information (serial number), the MAC address and the IP address that correspond to the given device 10 (the device 10-N) and that are acquired by the identifying information acquisition unit 307 are "AAAAAAAA", "BBBBBBBBBBBB", "CCCCCCCCCCCC", respectively, (see FIG. 7), the positional information on the given device 10 (the device 10-N) that is acquired by the positional information acquisition unit 305 is (ddd,eee) (see FIG. 10), and the second device identifying information (device ID) of the given device 10 (the device 10-N) that is generated by the device information manager 303 is "MAAAAAAAA" (see FIG. 13).

In this case, the positional information (ddd,eee) that is acquired by the positional information acquisition unit 305 is contained in the device information represented in FIG. 11.

Thus, by using the first device identifying information (the serial number: AAAAAAAA) that is acquired by the identifying information acquisition unit 307, the device information manager 303 updates the first device identifying information (the serial number: AAAAAAAB) that is associated with the positional information (ddd,eee) in the device information represented in FIG. 11.

Similarly, by using the MAC address "BBBBBBBBBBBB" that is acquired by the identifying information acquisition unit 307, the device information manager 303 updates the MAC address "BBBBBBBBBBBC" that is associated with the positional information (ddd,eee) in the device information represented in FIG. 11.

Similarly, by using the IP address "CCCCCCCCCCCC" that is acquired by the identifying information acquisition unit 307, the device information manager 303 updates the IP address "CCCCCCCCCCCD" that is associated with the positional information (ddd,eee) in the device information represented in FIG. 11.

Similarly, by using the second device identifying information (the device ID: MAAAAAAAA) that is generated by the device information manager 303, the device information manager 303 updates the second device identifying information (the device ID: MAAAAAAAB) that is associated with the positional information (ddd,eee) in the device information represented in FIG. 11.

As a result, the device information that is managed in the storage unit 301 and that is represented in FIG. 11 is updated to the device information represented in FIG. 14 and the device 10-N (the device ID: MAAAAAAAA) is registered as the device 10 to be managed by the device management device 30 and the device management information (counter value) corresponding to the failed existing device 10 (the device ID: MAAAAAAAB) is taken over to the device 10-N (the device ID: MAAAAAAAA) and is managed.

On the other hand, when the positional information matching the positional information that is acquired by the positional information acquisition unit 305 is not managed in the device information stored in the storage unit 301, the device information manager 303 registers the acquired first device identifying information, the generated second device identifying information, and the acquired positional information in the device information in association with one another.

For example, the device information manager 303 registers, in the device information that is stored in the storage unit 301, the generated second device identifying information (device ID), the first device identifying information (serial number), the MAC address and the IP address that are acquired by the identifying information acquisition unit 307, and the positional information that is acquired by the positional information acquisition unit 305 in association with one another.

The device information manager 303 regularly requests the device management information acquisition unit 311 to acquire the device management information on at least one device 10 to be managed among the devices 10-1 to 10-N from the at least one device 10. Specifically, the device management information acquisition unit 311 specifies the IP address of the device to be managed and issues a request for the device management information on the device 10.

Accordingly, the device management information acquisition unit 311 issues, to the specified device 10 to be managed among the devices 10-1 to 10-N, a request for the device management information on the device 10 to be managed. Specifically, the device management information acquisition unit 311 issues, to the IP address that is specified by the device information manager 303, a request for the device management information and acquires the second device management information and the device management information on the device 10 to be managed.

Based on the device management information that is acquired by the device management information acquisition unit 311, the device information manager 303 updates, in the device information that is managed in the storage unit 301, the device management information associated with the second device identifying information that matches the second device identifying information acquired by the device management information acquisition unit 311.

In the first embodiment, the device information manager 303 updates the device management information (counter value) associated with the second device identifying information by adding the device management information (counter value) acquired by the device management information acquisition unit 311 to the device management information (counter value) associated with the second device identifying information that matches the second device identifying information acquired by the device management information acquisition unit 311.

When the device information manager 303 updates the second device identifying information that is contained in the device information stored in the storage unit 301 by using the generated second device identifying information, the device information manager 303 issues a device identifying information update request containing the second device identifying information contained in the device information and the generated second device identifying information to the remote device management device 40.

For example, when the device information manager 303 updates the device information represented in FIG. 11 to the device information represented in FIG. 14, the device information manager 303 issues, to the remote device management device 40, a device identifying information update request containing the second device identifying information (the device ID: MAAAAAAAB) before the update, the second device identifying information (the device ID: MAAAAAAAA) after the update, the first device identifying information (the serial number: AAAAAAAA) after the update, the MAC address "BBBBBBBBBBBB" after the update, and the IP address "CCCCCCCCCCCC" after the update.

The device information manager 303 regularly issues, to the remote device management device 40, a device management information update request that contains the second device identifying information contained in the device information and the device management information associated with the second device identifying information that are stored in the storage unit 301.

The storage unit 401 stores remote device information with respect to each of the devices 10-1 to 10-N-1 to be managed. The remote device information contains at least the first device identifying information of the device 10 to be managed, the second device identifying information that uniquely identifies the device 10 to be managed, the device management information on the device 10 to be managed, and the positional information on the device 10 to be managed.

For example, the storage unit 401 stores, with respect to each of the devices 10-1 to 10-N-1 to be managed, the remote device information in which the device ID, the serial number, the MAC address, the IP address and the counter value corresponding to the device 10 to be managed are associated with one another.

The remote device manager 403 manages the remote device information in the storage unit 401 and performs various types of control for managing the remote device information. The remote device manager 403 manages the remote device information such that the device information stored in the storage unit 301 excluding the positional information and the remote device information stored in the storage unit 401 are synchronized with each other (identicalness is maintained).

Specifically, by using the generated second device identifying information contained in the device identifying information update request, the remote device manager 403 updates, in the remote device information stored in the storage unit 401, the second device identifying information that matches the second device identifying information contained in the device identifying information update request transmitted from the device management device 30.

Assume that, for example, the device ID, the serial number, the MAC address, the IP address and the counter value in the device information represented in FIG. 11 is stored in the storage unit 401 and the device information that is stored in the storage unit 301 and is represented in FIG. 11 is updated to the device information represented in FIG. 14. Furthermore, assume that the remote device manager 403 receives, from the device management device 30, a device identifying information update request that contains the second device identifying information (the device ID: MAAAAAAAB) before the update, the second device identifying information (the device ID: MAAAAAAAA) after the update, the first device identifying information (the serial number: AAAAAAAA) after the update, the MAC address "BBBBBBBBBBBB" after the update, and the IP address "CCCCCCCCCCCC" after the update.

In this case, the remote device manager 403 updates the second device identifying information (the device ID: MAAAAAAAB) contained in the remote device information by using the received second device identifying information (the device ID: MAAAAAAAA). By using the received first device identifying information (the serial number: AAAAAAAA), the remote device manager 403 updates the first device identifying information (the serial number: AAAAAAAB) associated with the device ID "MAAAAAAAB". Furthermore, by using the received MAC address "BBBBBBBBBBBB", the remote device manager 403 updates the MAC address "BBBBBBBBBBBC" associated with the device ID "MAAAAAAAB". Furthermore, by using the received IP address "CCCCCCCCCCCC", the remote device manager 403 updates the IP address "CCCCCCCCCCCD" associated with the device ID "MAAAAAAAB".

Furthermore, by using the device management information contained in the device identifying information update request, the remote device manager 403 updates, in the remote device information that is stored in the storage unit 401, the device management information associated with the second device identifying information matching the second device identifying information contained in the device management information update request transmitted from the device management device 30.

Accordingly, the device information stored in the storage unit 301 excluding the positional information and the remote device information stored in the storage unit 401 are synchronized with each other.

Figure 15:
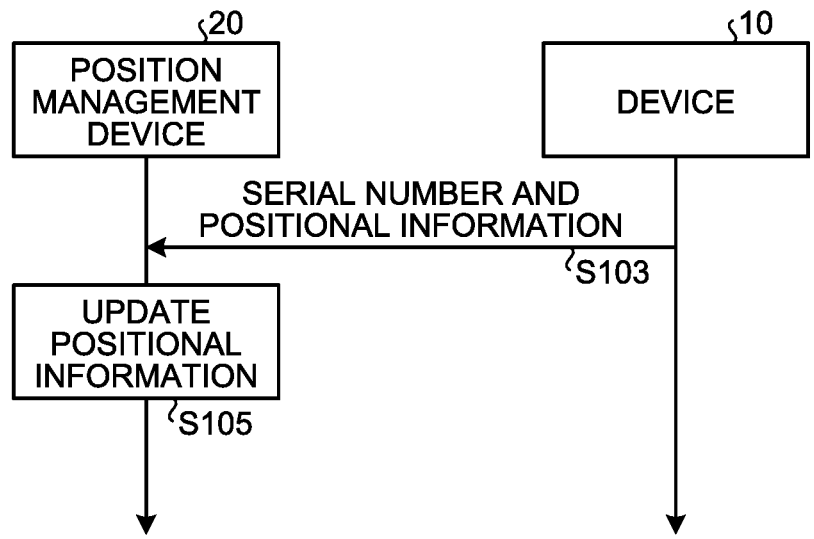
FIG. 15 is a sequence chart of an exemplary process of updating the position management information that is executed by the position management device of the first embodiment.

FIG. 15 is a sequence chart of an exemplary process of updating the position management information that is executed by the position management device 20 of the first embodiment. The process of updating the position management information is executed regularly.

First of all, the transmitter 107 of the device 10 transmits radio waves containing the first device identifying information (serial number) of the device 10 and the positional information on the device 10, which are stored in the positional information storage unit 105, by near-field communication and the positional information manager 203 of the position management device 20 acquires the first device identifying information (serial number) of the device 10 and the positional information on the device 10 by receiving the radio waves that are transmitted from the device 10 (step S103).

When the first device identifying information (serial number) matching the acquired first device identifying information (serial number) is contained in the position management information stored in the storage unit 201, the positional information manager 203 updates the positional information that is associated with the first device identifying information (serial number) by using the acquired positional information. On the other hand, when no first device identifying information matching the acquired first device identifying information is contained in the position management information stored in the storage unit 201, the positional information manager 203 registers a set of the first device identifying information (serial number) and the positional information that are acquired in the position management information (step S105).

Figure 16:
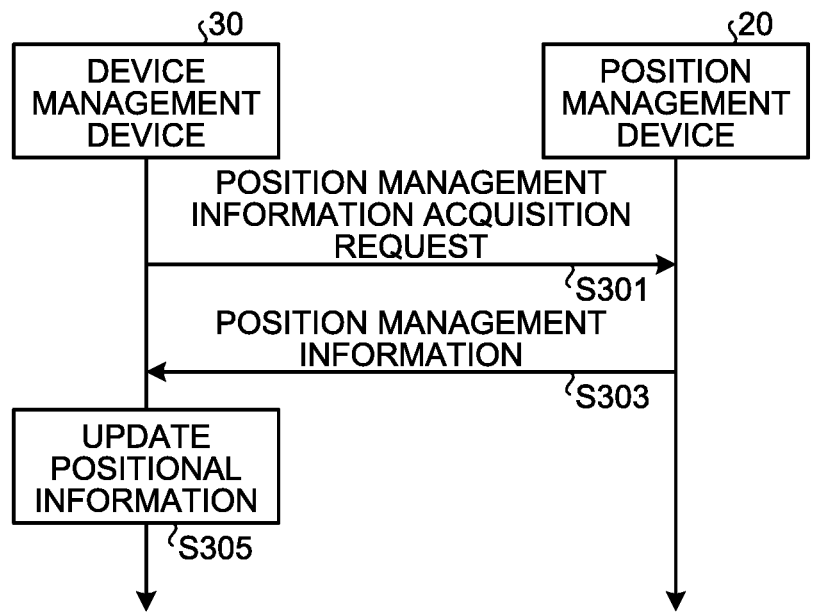
FIG. 16 is a sequence chart of an exemplary process of updating the positional information that is executed by the device management device of the first embodiment.

FIG. 16 is a sequence chart of an exemplary process of updating the positional information that is executed by the device management device 30 of the first embodiment. The process of updating the positional information illustrated in FIG. 16 is executed regularly.

First of all, the positional information acquisition unit 305 of the device management device 30 issues a request for the position management information to the position management device 20 based on the instruction to acquire position management information from the device information manager 303.

Once the device management device 30 issues the request for the position management information, the positional information manager 203 of the position management device 20 sends back the position management information stored in the storage unit 201 as a response to the device management device 30 (step S303).

By using the positional information associated with the first device identifying information contained in the position management information, the device information manager 303 of the device management device 30 updates, in the device information stored in the storage unit 301, the positional information associated with the first device information matching the first device information contained in the position management information that is acquired by the positional information acquisition unit 305 (step S305).

Figure 17:
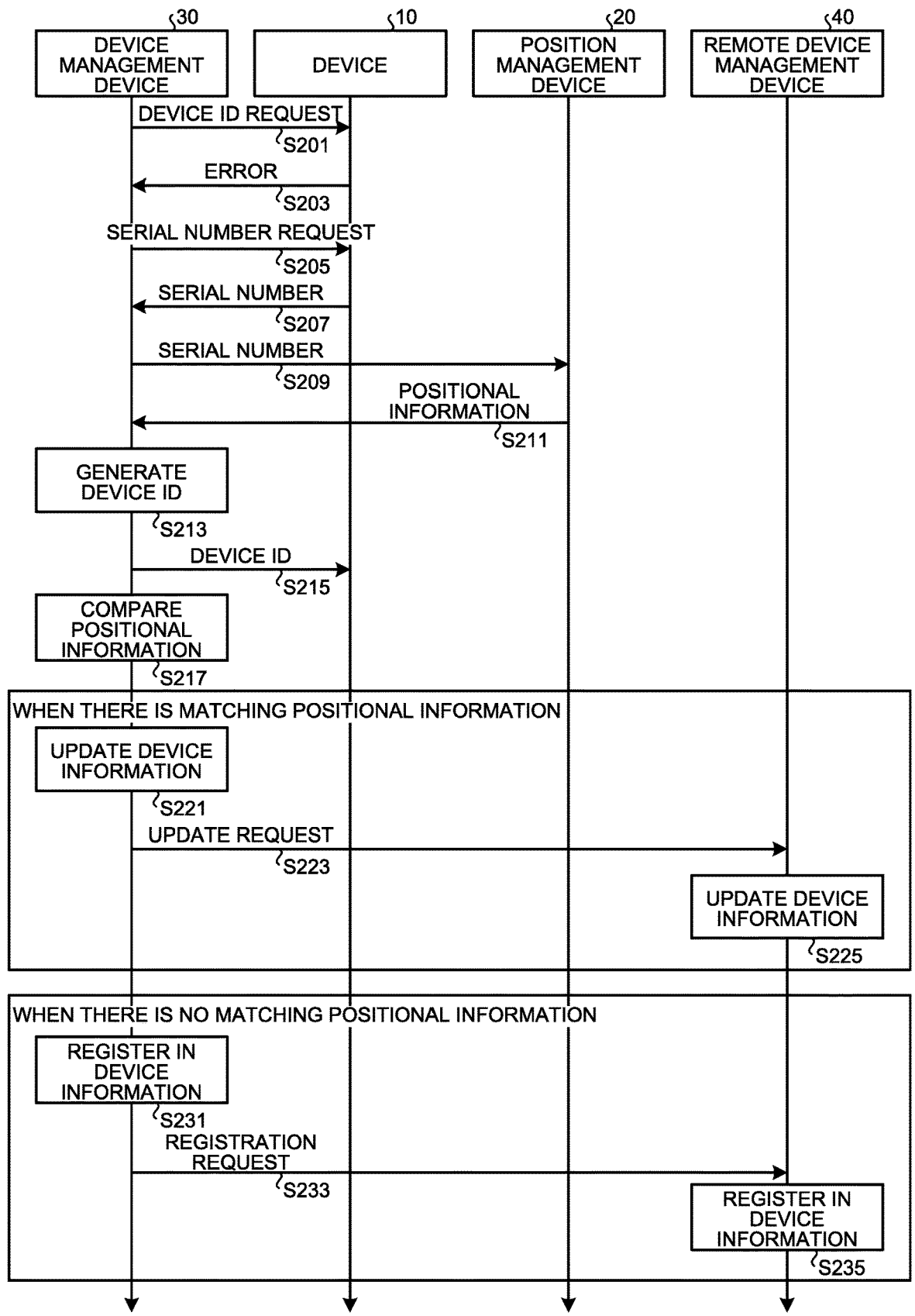
FIG. 17 is a sequence chart of an exemplary process of registering a device to be managed that is executed by the device management system of the first embodiment.

FIG. 17 is a sequence chart of an exemplary process of registering the device 10-N as a device to be managed that is executed by the device management system 1 of the first embodiment.

First of all, the identifying information acquisition unit 307 of the device management device 30 issues, to the device 10-N, a request for the second device identifying information of the device 10-N (step S201) and an error is sent from the controller 103 of the device 10-N as a response (step S203).

The identifying information acquisition unit 307 then issues a request for acquisition of the first device identifying information (serial number) of the device 10-N from the device 10-N (step S205) and the first device identifying information (serial number), the MAC address, and the IP address corresponding to the device 10-N are sent back as a response from the controller 103 of the device 10-N (step S207).

The positional information acquisition unit 305 of the device management device 30 transmits the first device identifying information (serial number) of the device 10-N, which is acquired by the identifying information acquisition unit 307, to the position management device 20 and requests the positional information that is associated with the first device identifying information (serial number) (step S209).

The positional information manager 203 of the position management device 20 then sends back, to the device management device 30 as a response, the positional information that is associated with the first device identifying information (serial number) matching the received first device identifying information (serial number) in the position management information stored in the storage unit 201 (step S211).

The device information manager 303 of the device management device 30 generates second device identifying information (device ID) of the device 10-N based on the first device identifying information (serial number) of the device 10-N that is acquired by the identifying information acquisition unit 307 (step S213).

The issuing unit 309 of the device management device 30 then issues the second device identifying information (device ID) that is generated by the device information manager 303 to the device 10-N (step S215).

The device information manager 303 compares each set of positional information in the device information that is stored in the storage unit 301 with the positional information that is acquired by the positional information acquisition unit 305 (step S217).

At step S217, when there is positional information matching the positional information acquired by the positional information acquisition unit 305, the device information manager 303 updates the device information by updating, in the device information stored in the storage unit 301, the second device identifying information (device ID), the first device identifying information (serial number), the MAC address and the IP address that are associated with the matching positional information by using the second device identifying information (device ID) that is generated by the device information manager 303 and the first device identifying information (serial number), the MAC address and the IP address that are acquired by the identifying information acquisition unit 307 (step S221).

The device information manager 303 then issues, to the remote device management device 40, a device identifying information update request containing the second device identifying information (device ID) before the update, the second device identifying information (device ID) after the update, the first device identifying information (serial number) after the update, the MAC address after the update, and the IP address after the update (step S223).

By using the second device identifying information (device ID) after the update, the first device identifying information (serial number), the MAC address and the IP address that are contained in the device identifying information update request, the remote device manager 403 of the remote device management device 40 then updates, in the remote device information stored in the storage unit 401, the second device identifying information (device ID) matching the second device identifying information (device ID) contained in the device identifying information update request that is transmitted from the device management device 30 and the first device identifying information (serial number), the MAC address and the IP address that are associated with the second device identifying information (device ID) (step S225).

On the other hand, at step S217, when there is no positional information matching the positional information acquired by the positional information acquisition unit 305, the device information manager 303 registers, in the device information stored in the storage unit 301, a set of the second device identifying information (the device ID) that is generated by the device information manager 303, the first device identifying information (serial number), the MAC address and the IP address that are acquired by the identifying information acquisition unit 306, and the positional information that is acquired by the positional information acquisition unit 305 (step S231).

The device information manager 303 then issues, to the remote device management device 40, a device identifying information registration request that contains the second device identifying information (device ID), the first device identifying information (serial number), the MAC address, and the IP address that are registered (step S233).

The remote device manager 403 of the remote device management device 40 registers, in the remote device information stored in the storage unit 401, the second device identifying information (device ID), the first device identifying information (serial number), the MAC address and the IP address that are contained in the device identifying information registration request that is transmitted from the device management device 30 (step S235).

Figure 18:
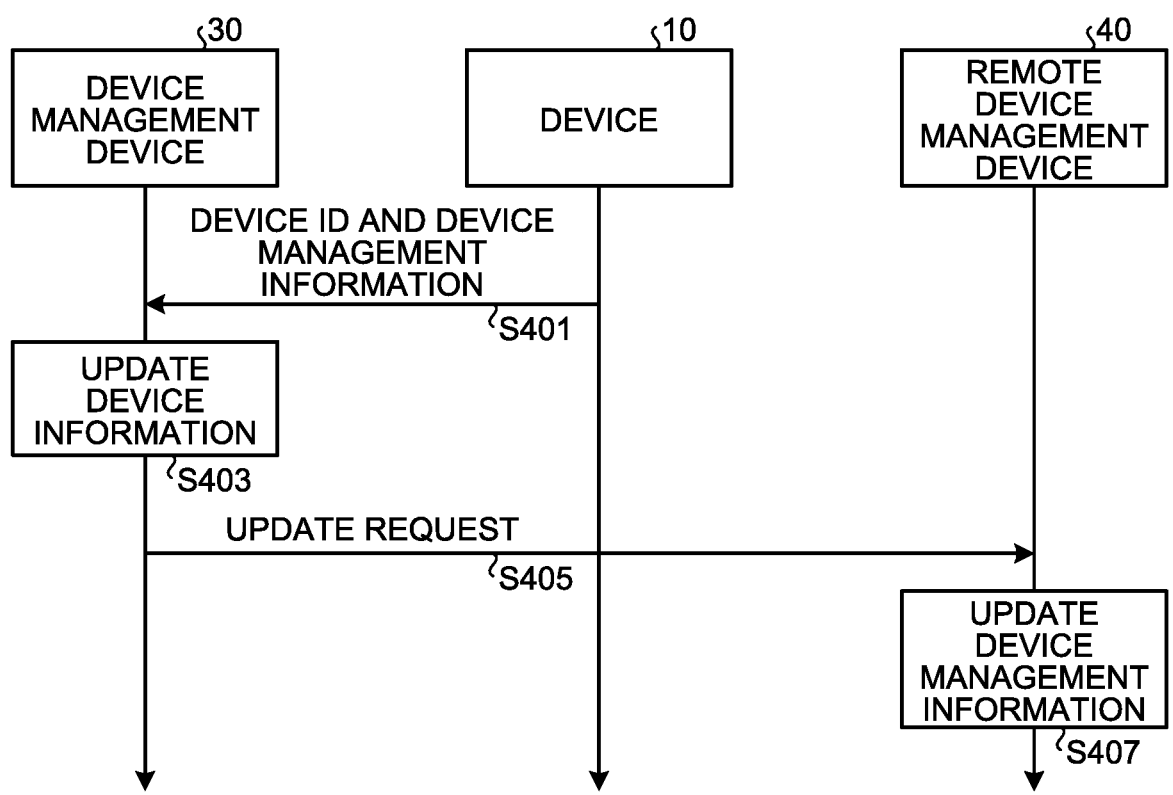
FIG. 18 a sequence chart of an exemplary process of updating the device management information that is executed by the device management system of the first embodiment.

FIG. 18 is a sequence chart of an exemplary process of updating the device management information that is executed by the device management system 1 of the first embodiment. The process of updating the device management information illustrated in FIG. 18 is executed regularly.

First of all, the device management information acquisition unit 311 of the device management device 30 acquires, from the device 10 to be managed, the second device identifying information (device ID) and the device management information corresponding to the device 10 to be managed (step S401). The device management information may be acquired according to a request from the device management information acquisition unit 311.

The device information manager 303 of the device management device 30 updates the device information by updating, in the device information managed in the storage unit 301 and based on the device management information acquired by the device management information acquisition unit 311, the device management information that is associated with the second device identifying information (device ID) matching the second device identifying information (device ID) acquired by the device management information acquisition unit 311 (step S403).

The device information manager 303 of the device management device 30 then issues, to the remote device management device 40, a device management information update request containing the updated device management information and the second device identifying information (device ID) associated with the device management information in the device information managed in the storage unit 301 (step S405).

By using the device management information contained in the device management information update request, the remote device manager 403 of the remote device management device 40 updates, in the remote device information stored in the storage unit 401, the device management information associated with the second device identifying information matching the second device identifying information contained in the device management update request that is transmitted from the device management device 30 (step S407).

As described above, according to the first embodiment, even when the device identifying information differs between a device to be managed whose corresponding device management information is taken over and a device to which the device management information is taken over, it is possible to take over and manage the device management information.

Particularly, according to the first embodiment, even when the device 10 to be managed is replaced, it is possible to take over the device management information on the device 10 to be managed before the replacement to the device management information on the device 10 to be managed after the replacement and manage the device management information.

Furthermore, according to the first embodiment, even when the motherboard of the device 10 to be managed is replaced and accordingly the first device identification information is changed, it is possible to take over and manage the device management information.

According to the first embodiment, even when the first device identification information is a MAC address and the MAC address is changed due to replacement of the network interface card (NIC), it is possible to take over and manage the device management information.

Furthermore, according to the first embodiment, it is possible to take over and manage the device management information and thus, even when, for example, a charging process is performed by using the device management information, it suffices if the charging process is performed directly by using the device management information. In other words, it is unnecessary to perform the charging process according to the device management information on the device before the replacement and the device management information on the device after the replacement, which thus makes it possible to curb the load associated with the charging process.

Modification 1

The first embodiment exemplifies the case where the position management device and the device management device are different from each other. Alternatively, the device management device may have the function of the position management device.

Figure 19:
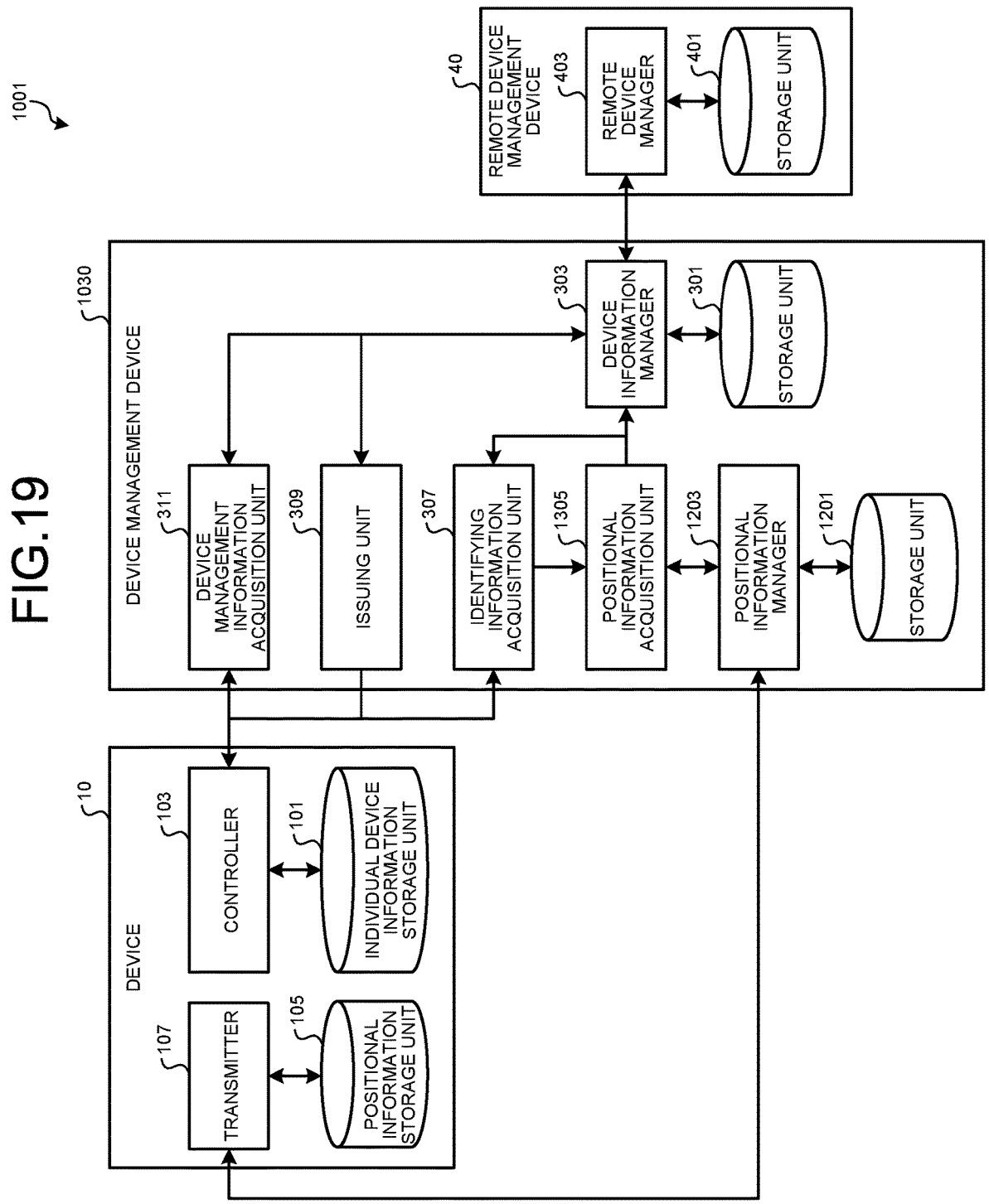
FIG. 19 is a block diagram of an exemplary functional configuration of a device management system of Modification 1.

In this case, it suffices if a device management device 1030 includes a storage unit 1201 and a positional information manager 1203 as can be seen in a device management system 1001 illustrated in FIG. 19. The storage unit 1201 and the positional information manager 1203 are respectively the same as the storage unit 201 and the positional information manager 203 of the first embodiment described above.

Modification 2

The first embodiment exemplifies the case where the position management device manages the position of a device. Alternatively, the position management device may manage the position of a member that can be used for a device. The member is, for example, a toner cartridge but is not limited to this. It suffices if the member is, for example, interchangeable consumables. When the device is, for example, a projector or a camera, the member is, for example, an interchangeable lens. When the device is an industrial camera, the member is, for example, a camera unit. In this case, the difference from the first embodiment is in that the first device identifying information is member identifying information that uniquely identifies the member.

In Modification 2, the position management information that the positional information manager 1203 manages in the storage unit 1201 is position management information with respect to each of multiple members in which the member identifying information that uniquely identifies the member and positional information representing the position of the member are associated with each other.

In Modification 2, the device information that the device information manger 303 manages in the storage unit 301 is device information with respect to each of at least one device 10 to be managed in which member identifying information of the member used for the device 10 to be managed, device management information for managing the device 10 to be managed, positional information on the member, and device identifying information (device ID) that uniquely identifies the device 10 to be managed are associated with one another.

In Modification 2, when the identifying information acquisition unit 307 issues, to a given one of at least one device 10 to be managed, a request for the device identifying information of the given device 10 to be managed and, when the identifying information acquisition unit 307 is not able to acquire the device identifying information, acquires the member identifying information of the member that is used for the given device 10 to be managed from the given device 10 to be managed.

In Modification 2, a positional information acquisition unit 1305 acquires positional information that is associated with the member identifying information that is acquired by the identifying information acquisition unit 307.

In Modification 2, the device information manager 303 generates device identifying information of the given device to be managed based on the member identifying information that is acquired by the identifying information acquisition unit 307 and, when positional information that matches the acquired positional information is managed, updates the member identifying information and the device identifying information that are associated with the managed positional information by using the member identifying information acquired by the identifying information acquisition unit 307 and the generated device identifying information.

As described above, the first device identifying information (serial number) may be replaced with the member identifying information that uniquely identifies the member (for example, the serial number of the member) to manage the device 10 to be managed. The device management information that manages the device 10 to be managed may be the member management information that manages the member.

Program

A program that is executed by the device, the position management device, the device management device, and the remote device management device of each of the embodiment and the modifications (hereinafter, "program executed by each of the devices") is stored in a computer-readable recording medium, such as a CD-ROM, a CD-R, a memory card, a digital versatile disk (DVD), or a flexible disk (FD), in a file in an installable form or an executable form and is provided.

The program that is executed by each of the devices of the embodiment and the modifications may be stored in a computer that is connected to a network, such as the Internet, and may be downloaded via the network to be provided. The program that is executed by each of the devices of the embodiment and the modifications may be provided or distributed via a network, such as the Internet. The program that is executed by each of the devices of the embodiment and the modifications may be incorporated in, for example, a ROM, in advance to be provided.

The program that is executed by each of the devices of the embodiment and the modifications has a module configuration for implementing each of the above-described units on a computer. With respect to practical hardware, for example, the CPU reads the program from the ROM into the RAM and executes the program and accordingly each of the above-described functional units is implemented on the computer.

According to the embodiment, there is an effect that, even when device identifying information differs between a device to be managed whose corresponding device management information is taken over and a device to be managed to which the device management information is taken over, it is possible to take over and manage the device management information.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device management system comprising:
a position management device that manages the positions of multiple devices; and
a device management device that is connected to the position management device via a first network and that manages at least one of the multiple devices to be managed,
wherein the position management device includes circuitry configured to manage, with respect to each device of the multiple devices, position management information in which first device identifying information that uniquely identifies the each device and positional information representing the position of the each device are associated with each other, and wherein
the device management device includes circuitry configured to
manage, with respect to each device of the at least one of the multiple devices to be managed, device information in which the first device identifying information of the each device to be managed, second device identifying information that uniquely identifies the each device to be managed, device management information for managing the each device to be managed, and the positional information of the each device to be managed are associated with one another;
issue, to a given one of the multiple devices, a request for the second device identifying information of the given device and, when the second device identifying information is not acquired, acquire the first device identifying information of the given device from the given device, wherein the second device identifying information is information previously generated, by the device management device for a previously monitored device of the multiple devices at a location associated with the given device, based on the first device identifying information of the previously monitored device having been sent from the previously monitored device to device management device; and
acquire, from the position management device, positional information that is associated with the acquired first device identifying information of the given device,
wherein the circuitry of the device management device generates second device identifying information of the given device based on the acquired first device identifying information of the given device and, when positional information that matches the acquired positional information is managed, updates the first device identifying information and the second device identifying information that are associated with the managed positional information respectively by using the acquired first device identifying information of the given device and the generated second device identifying information of the given device.

2. The device management system according to claim 1, wherein
when no positional information that matches the acquired positional information is managed, the circuitry of the device management device registers the acquired first device identifying information of the given device, the generated second device identifying information of the given device and the acquired positional information in association with one another in the device information.

3. The device management system according to claim 1, wherein,
the circuitry of the device management device regularly acquires the position management information from the position management device, and
the circuitry of the device management device updates the positional information that is associated with first device identifying information that matches the first device identifying information contained in the acquired position management information by using the positional information that is associated with the first device identifying information contained in the acquired position management information.

4. The device management system according to claim 1, wherein
the circuitry of the device management device regularly acquires the first device identifying information and the positional information from each of the multiple devices and, by using the acquired positional information, updates positional information that is associated with first device identifying information that matches the acquired first device identifying information.

5. The device management system according to claim 1, wherein
the circuitry of the device management device acquires the second device identifying information and the device management information from each of the at least one of the multiple devices to be managed, and based on the acquired device management information, the circuitry of the device management, device updates the device management information that is associated with second device identifying information that matches the acquired device identifying information.

6. The device management system according to claim 1, further comprising a remote device management device that is connected to the device management device via a second network, wherein the remote device management device includes circuitry configured to manage, with respect to each of the at least one of the multiple devices to be managed, the second device identifying information of the each of the at least one of the multiple devices to be managed and the device management information on the each of the at least one of the multiple devices to be managed in association with each other, and
when the second device identifying information is updated based on the generated second device identifying information, the circuitry of the device management device issues a device identifying information update request containing the second device identifying information and the generated second device identifying information to the remote device management device, and
by using the generated second device identifying information that is contained in the device identifying information update request, the circuitry of the remote device management device updates second device identifying information that matches the second device identifying information contained in the device identifying information update request.

7. The device management system according to claim 6, wherein
the circuitry of the device management device regularly issues a device management information update request that contains the second device identifying information and the device management information associated with the second device identifying information, and by using the device management information that is contained in the device management information update request, the circuitry of the remote device management device updates the device identifying information associated with the second device identifying information that matches the second device identifying information contained in the device management information update request.

8. A device management device that manages multiple devices, the device management device includes circuitry configured to manage, with respect to each device of the multiple devices, position management information in which first device identifying information that uniquely identifies the each device and positional information representing the position of the each device are associated with each other;

manage, with respect to each device of at least one of the multiple devices to be managed, device information in which the first device identifying information of the each device to be managed, second device identifying information that uniquely identifies the each device to be managed, device management information for managing the each device to be managed, and the positional information of the each device to be managed are associated with one another;

issue, to a given one of the multiple devices, a request for the second device identifying information of the given device and, when the second device identifying information is not acquired, acquire the first device identifying information of the given device from the given device, wherein the second device identifying information is information previously generated, by the device management device for a previously monitored device of the multiple devices at a location associated with the given device, based on the first device identifying information of the previously monitored device having been sent from the previously monitored device to device management device; and acquire positional information that is associated with the acquired first device identifying information of the given device, wherein the circuitry generates second device identifying information of the given device based on the acquired first device identifying information of the given device and, when positional information that matches the acquired positional information is managed, updates the first device identifying information and the second device identifying information that are associated with the managed positional information respectively by using the acquired first device identifying information of the given device and the generated second device identifying information of the given device.

9. A device management system comprising:

a position management device that manages the positions of multiple members that can be used for at least one device to be managed; and a device management device that is connected to the position management device via a first network and that manages the at least one device to be managed, wherein the position management device includes circuitry configured to manage, with respect to each device of the multiple devices, position management information in which member identifying information that uniquely identifies the member and positional information representing the position of the member are associated with each other, and the device management device includes circuitry configured to manage, with respect to each device of the at least one device to be managed, device information in which the member identifying information of the member used for the each device to be managed, device management information for managing the each device to be managed, the positional information on the member, and device identifying information that uniquely identifies the each device to be managed are associated with one another;

issue, to a given one of the at least one device to be managed, a request for the device identifying information of the given device to be managed and, when the device identifying information is not acquired, acquire the member identifying information of the member used for the given device to be managed from the given device to be managed, wherein the device identifying information is information previously generated, by the device management device for a previously monitored device of the at least one device to be managed at a location associated with the at least one device to be managed, based on the member identifying information of the previously monitored device having been sent from the monitored device to device management device; and acquire, from the position management device, positional information that is associated with the acquired member identifying information, and generate device identifying information of the given device to be managed based on the acquired member identifying information and, when positional information that matches the acquired positional information is managed, update the member identifying information and the device identifying information that are associated with the managed positional information respectively by using the acquired member identifying information and the generated device identifying information of the given device.

10. The device management system according to claim 1, wherein the position management device that manages the positions of the multiple devices manages the positions of the multiple devices by using near-field communications to detect RFID tags of the multiple devices in proximity to the position management device.

11. The device management device according to claim 8, wherein the circuitry configured to acquire positional information that is associated with the acquired first device identifying information comprises circuitry to acquire identification information stored in RFID tags of the multiple devices and acquired using near-field communications.

12. The device management system according to claim 9, wherein the positional information acquired from the position management device comprises identification information stored in RFID tags of the multiple devices and acquired using near-field communications.

13. The device management system according to claim 1, wherein the circuitry of the device management device regularly acquires, from each of the multiple devices, the first device identifying information from the first network and the positional information having been acquired using near-field communications with RFID tags, and, by using the acquired positional information, updates positional information that is associated with first device identifying information that matches the acquired first device identifying information.

* * * * *